United States Patent
Yang et al.

(10) Patent No.: US 11,658,959 B2
(45) Date of Patent: May 23, 2023

(54) USER AUTHENTICATION FRAMEWORK

(71) Applicant: Apple Inc., Cupertino, CA (US)

(72) Inventors: Xiangying Yang, Cupertino, CA (US); Ahmer A. Khan, Milpitas, CA (US); Martijn T. Haring, Cupertino, CA (US)

(73) Assignee: Apple Inc., Cupertino, CA (US)

(*) Notice: Subject to any disclaimer, the term of this patent is extended or adjusted under 35 U.S.C. 154(b) by 157 days.

(21) Appl. No.: 17/033,415

(22) Filed: Sep. 25, 2020

(65) Prior Publication Data
US 2021/0105265 A1    Apr. 8, 2021

Related U.S. Application Data

(60) Provisional application No. 62/911,832, filed on Oct. 7, 2019.

(51) Int. Cl.
| | |
|---|---|
| *H04L 29/06* | (2006.01) |
| *H04L 9/40* | (2022.01) |
| *H04L 9/32* | (2006.01) |

(52) U.S. Cl.
CPC ........ *H04L 63/0823* (2013.01); *H04L 9/3247* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 8,947,214 B2 | 2/2015 | Solomon | |
| 2007/0104323 A1* | 5/2007 | Hammell | H04L 63/104 380/30 |

| | | | |
|---|---|---|---|
| 2009/0132813 A1 | 5/2009 | Schibuk | |
| 2013/0036459 A1 | 2/2013 | Liberman et al. | |
| 2013/0243266 A1 | 9/2013 | Lazzouni | |

(Continued)

FOREIGN PATENT DOCUMENTS

| | | | |
|---|---|---|---|
| WO | 2015047442 A1 | 4/2015 | |
| WO | 2017021738 A1 | 2/2017 | |
| WO | WO-2018232111 A1 * | 12/2018 | .......... H04L 63/061 |

OTHER PUBLICATIONS

International Search Report and Written Opinion in Appl. No. PCT/US2020/054363 dated Nov. 20, 2020, 11 pages.

*Primary Examiner* — Benjamin E Lanier
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to authenticating a user with a mobile device. In some embodiments, a computing device stores a first signed attestation indicating an ability of the computing device to securely perform a user authentication. The computing device receives a request to store credential information of an identification document issued by an issuing authority to a user for establishing an identity of the user. In response to the request, the computing device sends, to the issuing authority, a request to store the credential information, the sent request including the first signed attestation to indicate an ability to perform a user authentication prior to permitting access to the credential information. In response to an approval of the sent request based on the first signed attestation, the computing device stores the credential information in a secure element of the computing device.

20 Claims, 10 Drawing Sheets

(56) References Cited

U.S. PATENT DOCUMENTS

| | | |
|---|---|---|
| 2013/0282438 A1 | 10/2013 | Hunter et al. |
| 2014/0013406 A1 | 1/2014 | Tremlet |
| 2015/0213659 A1 | 7/2015 | Marthinussen |
| 2015/0242605 A1* | 8/2015 | Du .................. G06F 21/31 726/7 |
| 2015/0288694 A1* | 10/2015 | Liebl, III .......... H04L 9/3247 713/182 |
| 2017/0213211 A1* | 7/2017 | Sibert ............ H04L 63/0861 |

* cited by examiner

USER AUTHENTICATION FRAMEWORK

The present application claims priority to U.S. Prov. Appl. No. 62/911,832, filed Oct. 7, 2019, which is incorporated by reference herein in its entirety.

BACKGROUND

Technical Field

This disclosure relates generally to mobile devices, and, more specifically, to authenticating a user with a mobile device.

Description of the Related Art

Various governments are now issuing various forms of identification that are capable of storing identification information that can be used to authenticate a user. For example, modern passports (called e-Passports) may include an electronic chip that stores a passport holder's name, date of birth, and other forms of information. When a person is passing through customs, the person may present the passport to a customs officer, who places the passport on a reader to extract information stored in the passport. Upon verifying the information printed on the passport against the internally stored information, the officer may confirm the identity of the holder and allow the holder passage through customs.

Figure 1:
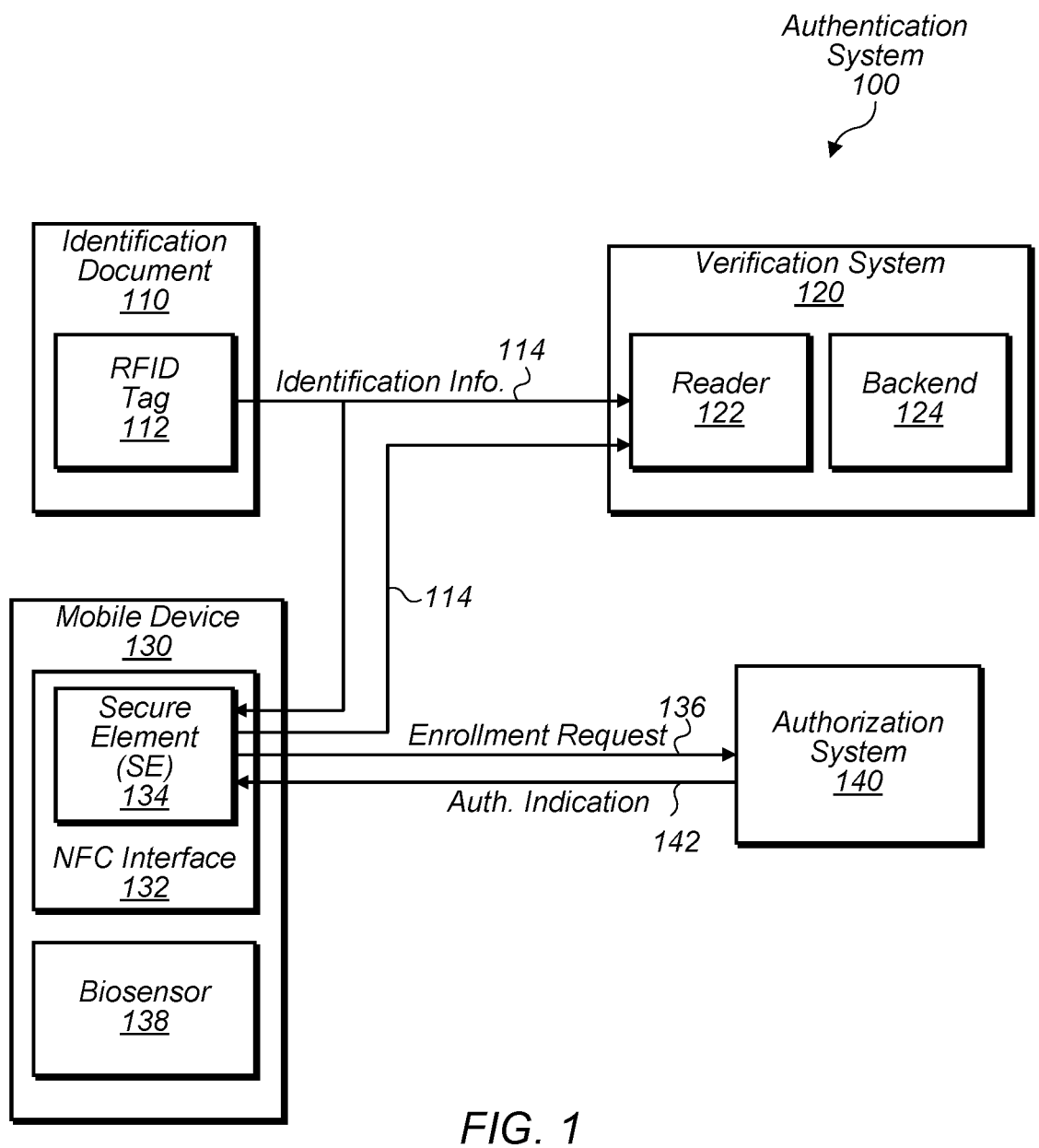
FIG. 1 is a block diagram illustrating one embodiment of a system for authenticating a user with a mobile device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "biosensor configured to collect biometric information" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to logical processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a person may present identification information through a mobile device instead of presenting a traditional form of identification. The present disclosure begins with a discussion about storing identification information (e.g., of a passport, driver license, government-issued ID, student ID, etc.) on a mobile device with respect to FIGS. 1-5B. The present disclosure then describes an authentication framework for performing a user authentication at the mobile device with respect to FIGS. 6 and 7.

Document Importation into Secure Element

As will be described below, in various embodiments, a mobile device includes a short-range communication interface (e.g., a near-field communication (NFC) radio) and a secure element configured to store identification information of a user. As used herein, the term "secure element" is to be interpreted according to its understood meaning in the art, and refers to circuitry that is configured to store information in a tamper-resistant manner that resists unauthorized extraction of that information. In such an embodiment, when the user presents the mobile device to a corresponding reader attempting to authenticate the user, the mobile device may attempt to verify the identity of the user (e.g., via a biosensor in the mobile device in some embodiments) before permitting the secure element to provide the identification information to the reader. For example, in one embodiment, the secure element is configured to store information present in a passport issued to the user. Accordingly, when the user is passing through a customs checkpoint, the user may present the mobile device to a reader operated by a customs agent. After the mobile device authenticates the user's identity, the secure element may convey the passport information to the reader. In some instances, being able to authenticate using a mobile device may help expedite establishing an identity of user and provide the convenience of performing an authentication without presenting the identification document.

In various embodiments, the mobile device may receive authorization to store the identification information captured in an enrollment process with the authority that issued the identification document. In some embodiments, this process may include the mobile device using the short-range communication interface to read information stored in circuitry included in the identification document—e.g., identification information stored in a radio-frequency identification (RFID) tag embedded in a passport. The secure element may then issue a request to the authority for permission to store the identification information, the request specifying at least portion of the read information—e.g., a passport number. The authority may then validate the request and permit the secure element to store the information, which may be signed by the authority in order to ensure validity of the information. In some embodiments, the enrollment process also includes the secure element generating a public-key pair and issuing a certificate signing request (CSR) to the authority in order to receive a corresponding digital certificate and register the public-key pair with the authority. (As used herein, the term "digital certificate" (or "certificate") is to be interpreted according to its understood meaning in the art, and refers to an electronic document that is usable to prove ownership of and attest to the validity of a public key and is signed by a trusted certificate authority (CA).) In some embodiments, the CSR is signed by a trusted key, which is stored in the secure element during fabrication and may be a certified private key having its own certificate signed by a trusted authority attesting to the validity of the stored key. In various embodiments, once the certificate has been issued for the newly generated key pair, the private key of the pair may be used to generate digital signatures to authenticate a user in lieu of a private key stored in circuitry of the identification document. Embodiments of these concepts are described in further detail below with respect to FIGS. 1-3C.

In some embodiments, the mobile device may perform an authentication that includes the secure element confirming whether a holder of an identification document has an attribute satisfying some criterion without providing that attribute (or at least providing some information about that attribute without providing all information about that attribute). For example, in one embodiment, a person may be attempting to purchase an item that requires the merchant to confirm whether an age of the person satisfies some threshold value. In such an embodiment, rather than having the user present the identification document (e.g., a driver license), the reader of the merchant may ask the secure element to confirm whether the user of the mobile device is old enough to purchase the item. Based on a stored date of birth and a successful authentication of the user (e.g., via a biosensor), the secure element may then answer in the affirmative or the negative (as opposed to actually communicating the user's age or date of birth). In doing so, the mobile device is able to protect a user's identification information, yet still adequately answer the merchant's inquiry. Embodiments of these concepts are described in further detail below with respect to FIGS. 4-5B.

Turning now to FIG. 1, a block diagram of an authentication system 100 is depicted. In the illustrated embodiment, authentication system 100 includes an identification document 110, a verification system 120, mobile device 130, and authorization system 140. As shown, document 110 may include an RFID tag 112. Verification system 120 may include a reader 122 and backend 124. Mobile device 130 may include a near-field communication (NFC) interface 132, a secure element (SE) 134, and a biosensor 138. In some embodiments, system 100 may be arranged differently than shown. For example, in some embodiments, reader 122 and backend 124 may be located in distinct systems. In some embodiments, document 110 may include no RFID tag 112 or embed circuitry other than an RFID tag 112. In some embodiments, SE 134 may be external to NFC interface 132.

Identification document 110 corresponds to any suitable form physical identification usable to establish an identity of a holder such as a passport, driver license, government-issued ID, student ID, etc. Accordingly, document 110 presents various forms of information about a user including, for example, a user's name, date of birth, place of residence, etc. Document 110 may include a photograph of the document holder. Document 110 may also include a unique identification number such as passport number, driver license number, etc. Document 110 may also identify the issuing authority such as the particular country, government, university, etc. In various embodiments, document 110 may not only depict this information on the face of the document, but also store this information in circuitry or a magnetic strip embedded in the document 110 shown as identification information 114. For example, in the illustrated embodiment, document 110 includes RFID tag 112 for storing this information 114. In such an embodiment, document 110 may store information in compliance with known standards such as the ISO/IEC 18000 standards and/or ISO/IEC 14443 standards. In other embodiments, document 110 includes other forms of circuitry such as a smart card chip compliant with ISO/IEC 7816, a Bluetooth™ enabled chip, etc. In some embodiments, information stored in this circuitry may be signed by the issuing authority in order to prevent modification; the embedded circuitry may also include a digital certificate usable to verify the digital signature. In some embodiments, the circuitry embedded in document 110 is configured to store a private key and to generate digital signatures with the key in order to authenticate the holder.

Verification system 120, in one embodiment, is a computer system configured to authenticate a person that presents identification document 110. In various embodiments, system 120 uses reader 122 for extracting information 114 stored in document 110. Accordingly, reader 122 may include a short-range radio for communicating with the RFID tag 112 in order to read the identification information stored in the tag 112. In some embodiments, reader 122 may also include a display that presents the information 114 to a reviewer such as a customs agent attempting to verify passport information. In various embodiments, verification system 120 confirms information read by reader 122 against a backend system 124, which may be implemented by one or more computer systems located elsewhere from reader 122. In some embodiments, backend 124 maintains a database, which may include the information stored in document 110, an indication of whether document 110 is still valid (e.g., has not been reported as being lost), etc. In some embodiments, backend 124 implements a certificate authority (CA) capable of issuing certificates for received certificate signing requests (CSRs). In some instances, reader 122 and/or backend 124 are operated by the authority that issued the identification document 110. In other instances, reader 122 may be operated by another entity such as a customs agent located in another country, a merchant (as discussed with respect to FIG. 4), etc. In some embodiments, backend 124 may be operated by a third-party interacting with the issuing authority.

Mobile device 130 corresponds to any suitable form of device such as mobile phone, tablet, wearable device (e.g., a watch), laptop, etc. As noted above, in various embodiments, mobile device 130 is configured to store identification information 114 from document 110 and present that to verification system 120 in order to authenticate a user of mobile device 130, which is also a holder of document 110. In the illustrated embodiment, mobile device 130 (or more specifically SE 134) interacts with identification document 110, verification system 120, and/or authorization system 140 via NFC interface 132.

Near-field communication (NFC) interface 132, in one embodiment, is a short-range radio circuit configured to implement one or more NFC standards such as those defined by ISO/IEC 18000. In other embodiments, interface 132 may implement other short-range radio access technologies (RATs) such as Bluetooth™, ZigBee™, Wi-Fi™, etc. In some embodiments, mobile device 130 may also include a long-range radio for interacting with systems 120 and 140 such one supporting various cellular RATs.

Secure element (SE) 134, in one embodiment, is a secure element configured to store identity information 114, which is also stored in RFID 112. Accordingly, SE 134 employs various techniques to resistant extraction of information 114 such as using strong encryption, having a restricted access interface, attempting to destroy information 114 in response to tamper detection, etc. In some embodiments, SE 134 is configured to store all information 114 that is also stored in RFID tag 112. In other embodiments, SE 134 is configured to store a token that is usable to retrieve some or all of this information 114 from backend 124. For example, in one embodiment, rather than store a photograph that is stored in tag 112, SE 134 stores a token that is usable to retrieve this photograph—thus enabling SE 134 to conserve memory. In various embodiments, when a user presents mobile device 130 to a reader 122, NFC interface 132 presents SE 134 with a request for information from reader 122. Upon receiving the request, SE 134 may verify that the user has been authenticated by mobile device 130 before providing information 114 to reader. As will be discussed below, in some embodiment, this authentication may be performed using biosensor 138. In other embodiments, the user may be authenticated differently such as, in one embodiment, being presented with a prompt on a touch screen of mobile device 130 and asked to enter a passcode. Upon a successful authentication of the user, in various embodiments, SE 134 communicates information 114 to reader 122 via an encrypted connection established through NFC interface 132. Prior to interacting with verification system 120, mobile device 130 may perform an enrollment process in order for SE 134 to be permitted to store information 114 and interact with verification system 120.

Authorization system 140, in one embodiment, is a computer system configured to facilitate enrollment of mobile device 130. In some embodiments, authorization system 140 is operated by the authority that issued document 110 (or a third party that interacts with the issuing authority). In various embodiments, mobile device 130 begins enrollment by reading at least a portion of information 114 stored in identification document 110, such as the identification number and the name of the person that holds document 110. In the illustrated embodiment, mobile device 130 reads this information from RFID tag 112 via NFC interface 132; in other embodiments, this information may be extracted differently such as using a camera of device 130 to capture information from document 110, having a user manually enter this information, etc. Upon reading this information, SE 134 may encrypt this information and communicate it in an enrollment request 136 to system 140. Although depicted as being communicated via NFC interface 132, in some embodiment, this request 136 via another interface of mobile device 130 such a cellular interface. Authorization system 140 may then attempt to validate this request 136— i.e., confirm that the request 136 is coming from a phone operated by the holder of document 110.

In some embodiments, authorization system 140 validates the request 136 through one or more back channels. For example, in one embodiment, authorization system 140 may rely on a trusted person, such a customs agent, to confirm that device 130 is in possession of document 110's holder at the time of enrollment. In other embodiments, authorization system 140 may present a website usable to assist in validating a request 136. For example, in one embodiment, this website may allow a user to validate the request via the Global Online Enrollment System (GOES) operated by the U.S. Department of Homeland Security. In another embodiment, authorization system 140 may be able to sufficiently validate the request 136 by verifying its information against information stored in backend 124.

In various embodiments, once the authorization system 140 has successfully validated the request 136, authorization system 140 is configured to provide an authorization indication 142 to SE 134 in order to indicate that SE 134 has been authorized to store identification information 114. In various embodiments, this indication 142 includes a signed copy of the information 114 that is stored in document 110 (and/or a signed copy of a token stored in lieu of storing information 114 in some embodiments). In some embodiments, system 140 obtains information 114 by querying backend 124 using the information provided in request 136 such as an identification number of document 110. In other embodiments, SE 134 may be able to successfully read all information 114 from RFID tag 112 and is configured to include this information in its request 136. In such an embodiment, system 140 may merely sign the request 136 including the information 114 within it and provide this signed request as the authorization indication 142. In another embodiment, indication 142 includes a token generated by system 140 that can be presented to verification system 120 in order to retrieve information 114 from backend 124.

In some embodiments, the enrollment process also includes SE 134 establishing a private key that can be used to generate digital signatures to authenticate a user. In such an embodiment, SE 134 is configured to generate a public-key pair and to issue a CSR to receive a corresponding certificate. In some embodiments, SE 134 issues the CSR to backend 124 and includes the received authentication indication 142 in the CSR. Backend 124 acting as a certificate authority may then issue the corresponding certificate to SE 134 for storage. In some embodiments, backend 124 may also store a copy of certificate and associate it the information that it maintains on the holder of document 110. In other embodiments, this CSR may be sent as part of request 136 (or in conjunction with request 136) to authorization system 140.

As noted above, in some embodiments, biosensor 138 is used to authenticate a user of mobile device 130 before SE 134 provides identification information 114 to reader 122. Biosensor 138 corresponds to any suitable sensor configured to detect biometric data for a user of mobile device 130. Biometric data is data that uniquely identifies the user among other humans (at least to a high degree of accuracy) based on the user's physical or behavioral characteristics. For example, in some embodiments, biosensor 138 is a finger print sensor that captures fingerprint data from the user. In some embodiments, other types of biometric data may be captured by sensor 260A such as voice recognition (identifying the particular user's voice), facial recognition; iris scanning, etc.

In various embodiments, SE 134 is configured to associate identification information 114 with biometric data captured by biosensor 138 when enrollment is performed in order to ensure that a person later attempting to authenticate with mobile device 130 is the same person during enrollment. In some embodiments, SE 134 associates information 114 with the biometric data by storing a unique index value that corresponds with the captured biometric data. SE 134 may also cryptographically bind this value to information 114 by encrypting them together. As will be described with respect to FIG. 2, in some embodiments, a separate circuit (referred to below as a secure enclave processor) is configured to store previously captured biometric data and compare it against newly acquired biometric during an authentication. In some embodiments, when this circuitry detects a match, it indicates to SE 134 not only that a match was detected, but also provides a unique index value associated with the match. In such an embodiment, SE 134 uses the index value to look up stored information 114. For example, in one embodiment, a user may register multiple fingers during an enrollment process, where each finger is assigned a unique index value that is associated with the newly stored information 114. When a user later attempts to authenticate with a reader 122 and uses one of the previously registered fingers (or a combination of the fingers in some embodiments), the secure enclave processor may provide the corresponding unique index value (or values), which is used by SE 134 to lookup the information 114 and provide to reader 122. If, however, the user (or another user) attempts to register another finger after enrollment, the secure enclave processor may provide a unique index value, which may result in SE 134 being unable to look up the previously stored information 114—thus, preventing SE 134 from providing the requested information 114. In some embodiments, the previously captured biometric data used in the biometric comparison may originate from identification document 110 or be provided by authorization system 140.

Embodiments of the enrollment and authentication processes are described in further detail below with respect to FIGS. 3A-3C.

Figure 2:
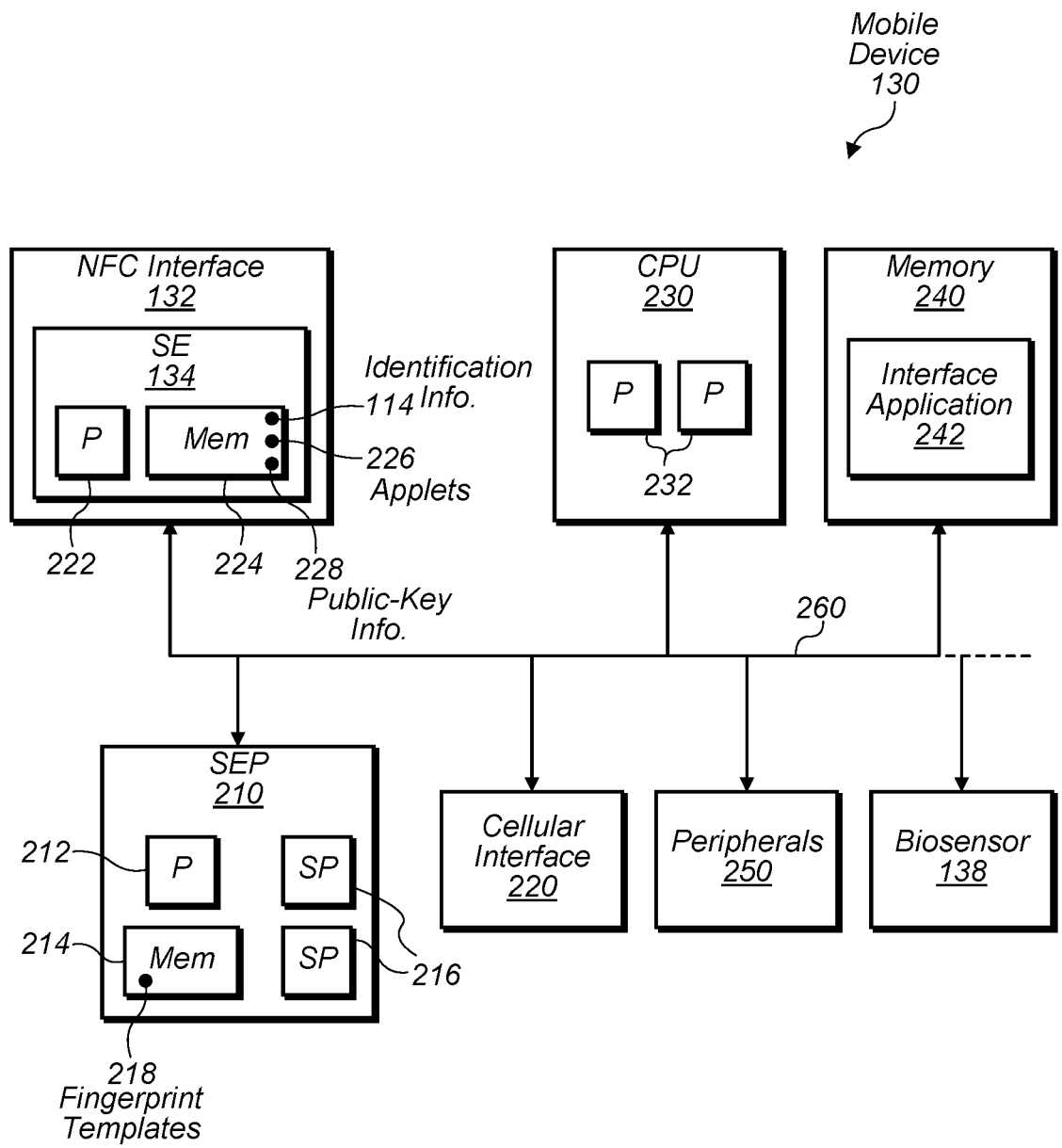
FIG. 2 is a block diagram illustrating one embodiment of the mobile device.

Turning now to FIG. 2, a block diagram of a mobile device 130 is depicted. As noted above, mobile device 130 may include NFC interface 132, SE 134, and biosensor 138. In the illustrated embodiments, mobile device 130 further includes a secure enclave processor (SEP) 210, cellular interface 220, CPU 230, memory 240, peripherals 250 coupled via a communication fabric 260. As shown, SEP 210 may include one or more processors P 212, a secure memory 214, and one or more security peripherals 216. SE 134 may include one or more processors P 222 and a memory 224. CPU 230 may include one or more processors P 232. Memory 240 may store an interface application 242. In some embodiments, mobile device 130 may be implemented differently from shown.

As noted above, in some embodiments, SEP 210 is configured to maintain previously captured biometric data of an authorized user and compare it against newly received data captured by biosensor 138 in order to authenticate a user. (In another embodiment, biosensor 138 or SE 134 may perform the comparison.) In the illustrated embodiment, SEP 210 is configured to store biometric data collected from fingerprints as fingerprint templates 218, which may be stored internally as shown or in another memory such as memory 240. In such an embodiment, each template 218 may correspond to a particular registered finger and be assigned a unique index value. As noted above, in some embodiments, if fingerprint data received from biosensor 138 matches the fingerprint data stored in a template 218, SEP 210 is configured to provide the unique index value associated with the matching template 218 to SE 134, which, in turn, uses the index value to look up the corresponding identification information 114 associated with that value. In some embodiments, SEP 210 may store multiple templates 218 associated with a set of identification information 114, where each finger individually or a combination of fingers may be used to enable the release of identification information 114. In various embodiments, communications between SEP 210, SE 134, and biosensor 138 are encrypted such that another entity, such as CPU 230, is unable to view their communications.

In various embodiments, SEP 210 implements a secure element, distinct from SE 134, in order to securely store biometric data. Accordingly, in various embodiments, SEP 125 is isolated from the rest of the mobile device 130 except for a carefully controlled interface (thus forming a secure enclave for SEP processor 212, secure memory 214, and security peripherals 216). Because the interface to SEP 210 is carefully controlled, direct access to SEP processor 212, secure memory 214, and security peripherals 216 may be prevented. In one embodiment, a secure mailbox mechanism may be implemented. In the secure mailbox mechanism, external devices may transmit messages to an inbox. SEP processor 212 may read and interpret the message, determining the actions to take in response to the message. Response messages from the SEP processor 212 may be transmitted through an outbox, which is also part of the secure mailbox mechanism. Other interfaces that permit only the passing of commands/requests from the external components and results to the external components may be used. No other access from the external devices to SEP 210 may be permitted, and thus the SEP 210 may be "protected from access". More particularly, software executed anywhere outside SEP 210 may be prevented from direct access to the secure components with the SEP 210. SEP processor 212 may determine whether a command is to be performed. In some cases, the determination of whether or not to perform the command may be affected by the source of the command. That is, a command may be permitted from one source but not from another.

In some embodiments, SEP processor 212 may execute securely loaded software that facilitates implementing functionality descried with respect to SEP 210. For example, a secure memory 214 may include software executable by SEP processor 212. One or more of the security peripherals 216 may have an external interface, which may be connected to a source of software (e.g. a non-volatile memory such as Flash memory). In another embodiment, the source of software may be a non-volatile memory coupled to another peripheral 216, and the software may be encrypted to avoid observation by a third party. The software from the source may be authenticated or otherwise verified as secure, and may be executable by SEP processor 212. In some embodiments, software may be loaded into a trust zone in memory 214 that is assigned to the SEP 210, and SEP processor 212 may fetch the software from the trust zone for execution. The software may be stored in the memory 240 in encrypted form to avoid observation. Despite the steps taken to ensure security of the secure software, the secure software may still be prevented from directly accessing/obtaining stored private keys. Only hardware may have access to private keys, in an embodiment.

Security peripherals 216 may be hardware configured to assist in the secure services performed by SEP 210. Accordingly, security peripherals 216 may include authentication hardware implementing/accelerating various authentication algorithms, encryption hardware configured to perform/accelerate encryption, secure interface controllers configured to communicate over a secure interface to an external (to mobile device 130) device, etc.

In some embodiments, SE 134 may implement similar functionality as SEP 210 in order to restrict access to confidential information stored in memory 224 such as identification information 114 and public-key information 228. For example, SE 134 may implement a mailbox to restrict access to processor 222 and memory 224. In various embodiments, SE processor 222 also executes securely loaded software in order to implement functionality described herein such as applets 226 stored in memory 224.

Applets 226, in one embodiment, are executable to perform enrollment of mobile device 130 and authentication with a reader 122. With respect to enrollment, applets 226 may be executable to extract information 114 from an RFID tag 112 and issue a corresponding enrollment request 136. In some embodiments, applets 226 are executable to generate public-key pairs and obtain corresponding certificates, which may be stored in memory 224 as public-key information 228. With respect to authentication, applets 226 may service requests from information 114 from readers 122 and may process comparison results indicated by SEP 210. In some embodiments, if a particular comparison performed by SEP 210 does not result in a match, SE 134 may be configured to restrict (or stop) execution an applet 226 in order to prevent it from servicing a request from information 114 from a reader 122.

Interface application 242, in one embodiment, is executable to facilitate interfacing between SEP 210, SE 134, and a user of mobile device 130 when enrollment and authentication are performed. Accordingly, application 242 may provide various prompts to the user instructing the user to perform various actions during these processes. Application 242 may also activate biosensor 138, SEP 210, and/or SE 134 when appropriate during these processes. Various actions performed by application 242 are described in further detail below with respect to FIGS. 3A-3C.

Cellular Interface 220, in one embodiment, is a long-range radio configured to facilitate interaction between mobile device 130 and one or more external systems such as systems 120 and 140. Cellular link 220 may include suitable circuitry for interfacing with long-range networks such as a baseband processor, analog RF signal processing circuitry (e.g., including filters, mixers, oscillators, amplifiers, etc.), digital processing circuitry (e.g., for digital modulation as well as other digital processing), one or more antennas, etc. Cellular interface 220 may be configured to communicate using any of multiple radio access technologies/wireless communication protocols such as GSM, UMTS, CDMA2000, LTE, LTE-A, etc.

As mentioned above, CPU 230 may include one or more processors 232. Generally, a processor may include circuitry configured to execute instructions defined in an instruction set architecture implemented by the processor. Processors 232 may include (or correspond to) processor cores implemented on an integrated circuit with other components as a system on a chip (SOC) or other levels of integration. Processors 232 may further include discrete microprocessors, processor cores and/or microprocessors integrated into multichip module implementations, processors implemented as multiple integrated circuits, etc.

Processors 232 may execute the main control software of the system, such as an operating system. Generally, software executed by CPU 230 during use may control the other components of the system to realize the desired functionality of the system. The processors may also execute other software. These applications may provide user functionality, and may rely on the operating system for lower-level device control, scheduling, memory management, etc. Accordingly, processors 232 (or CPU 230) may also be referred to as application processors. CPU 230 may further include other hardware such as an L2 cache and/or an interface to the other components of the system (e.g. an interface to the communication fabric 260).

Memory 240 may generally include the circuitry for storing data. For example, memory 240 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 130 may include a memory controller (not shown) that may include queues for memory operations, for ordering (and potentially reordering) the operations and presenting the operations to the memory 240. The memory controller may further include data buffers to store write data awaiting write to memory and read data awaiting return to the source of the memory operation. In some embodiments, the memory controller may include a memory cache to store recently accessed memory data. In some embodiments, memory 240 may include program instructions, such as instructions of application 242, that are executable by one or more processors 232 to cause device 130 to perform various functionality described herein with respect to device 130.

Peripherals 250 may be any set of additional hardware functionality included in device 130. For example, peripherals 250 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 250 may include audio peripherals such as microphones, speakers, interfaces to microphones and speakers, audio processors, digital signal processors, mixers, etc. Peripherals 250 may include interface controllers for various interfaces including interfaces such as Universal Serial Bus (USB), peripheral component interconnect (PCI) including PCI Express (PCIe), serial and parallel ports, etc. Peripherals 250 may include networking peripherals such as media access controllers (MACs). Any set of hardware may be included.

Communication fabric 260 may be any communication interconnect and protocol for communicating among the components of device 130. Communication fabric 260 may be bus-based, including shared bus configurations, cross bar configurations, and hierarchical buses with bridges. Communication fabric 260 may also be packet-based, and may be hierarchical with bridges, cross bar, point-to-point, or other interconnects.

Although FIG. 2 depicts components within mobile device 130, it is noted that similar components may exist in computer systems used to implement other functionality described herein such as functionality described with respect to verification system 120 and authorization systems 140. Accordingly, these systems may also include CPUs, memory, various network interfaces, and peripherals such as those described above.

Figure 3A:
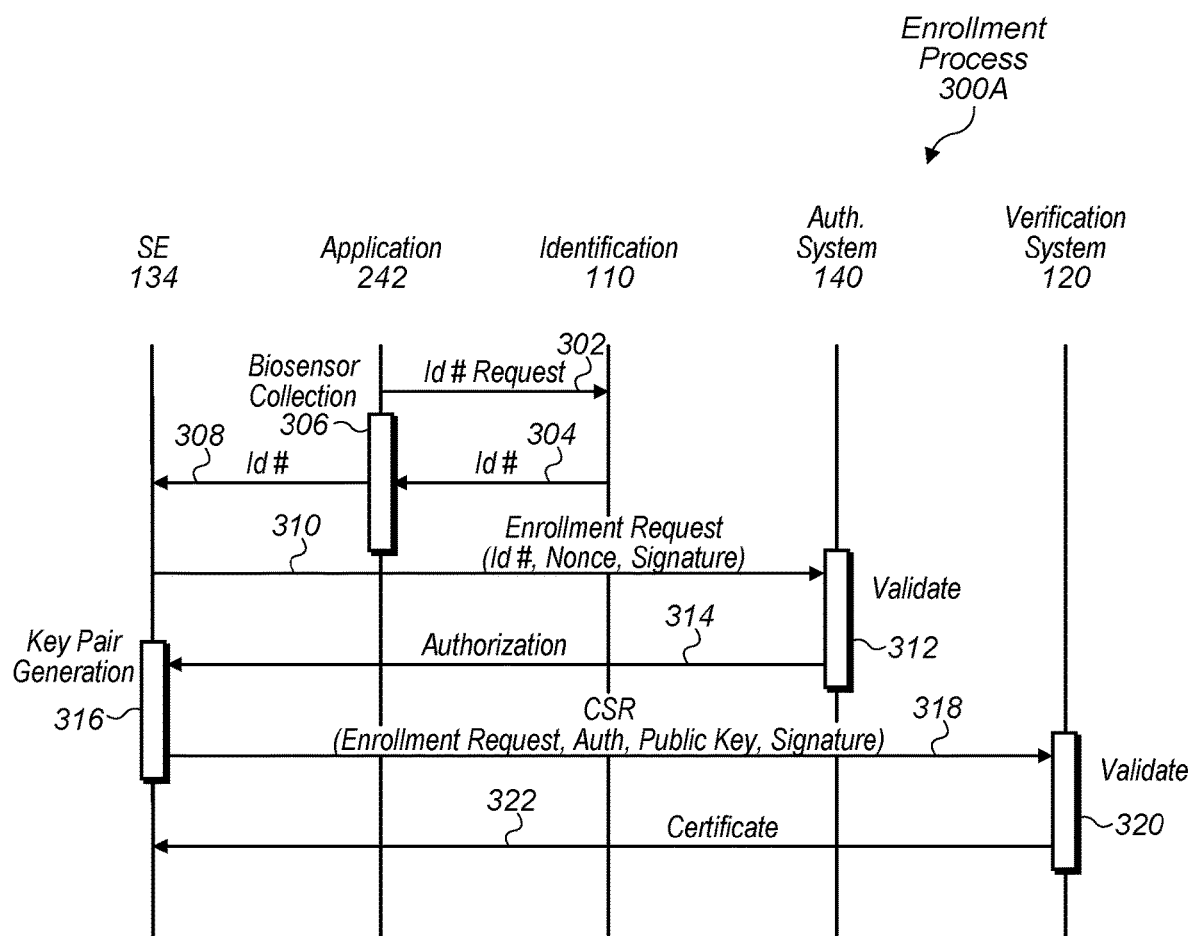
FIGS. 3A-3C are communication diagrams illustrating embodiments of enrollment and authentication processes used by the authentication system.

Turning now to FIG. 3A, a communication diagram of an enrollment process 300A is depicted. As discussed above, in various embodiments, enrollment process 300A may be performed by mobile device 130 in order to obtain authorization to store identification information 114 from an identification document 110.

As shown, process 300A begins at 302 with application 242 issuing a request to read an identification number, such as a passport number or other portion of information 114, via NFC interface 132. In response to receiving the number at 304, application 242 activates biosensor 306 to collect biometric data from the user before providing the identification number to SE 134 at 308. In the illustrated embodiment, SE 134 then issues an enrollment request 136 at 310 that includes the number, a nonce, and a digital signature. (As used herein, the term "nonce" is to be interpreted according to its understood meaning in the art, and includes an arbitrary number that is only used once in a cryptographic operation.) In some embodiments, the digital signature is generated using a trusted key (e.g., a certified private key) stored in SE 134 during fabrication, and authorization system 140 may include the corresponding certificate. At 312, authorization systems 140 validates the request by verifying the identification number and the digital signature. In some embodiments, the validation may also include verifying the request via one or more back channels as discussed above. Upon a success validation, authorization system 140 provides an authorization indication 142 at 314 to SE 134. At 316, SE 134 generates a public-key pair to be associated with the identification information 114 and usable to authenticate the user. At 318, SE 134 then issues, to verification system 120, a certificate signing request (CSR) that, in the illustrated embodiment, includes the previous enrollment request 136, the received authentication indication 142, a public key of the generated pair, and a digital signature generated by the corresponding private key. In various embodiments, the CSR is signed using the trusted key stored in SE 134 during fabrication as mentioned above. After successfully validating the CSR at 320, verification system 120 issues the corresponding certificate to SE 134 for storage at 322.

Figure 3B:
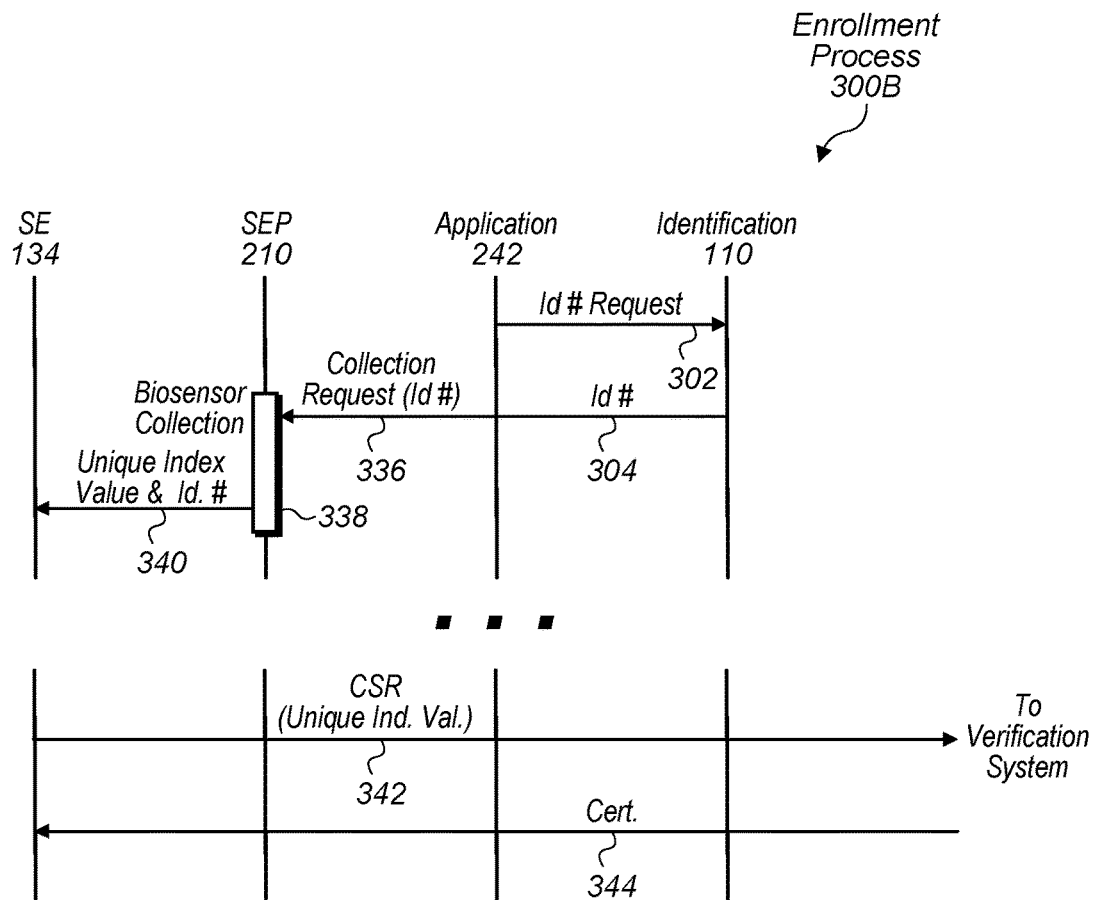

Turning now to FIG. 3B, a communication diagram of another enrollment process 300B is depicted. Enrollment process 300B is another embodiment of an enrollment process in which a unique index value is associated with the stored identification information 114.

As shown, process 300B begins in a similar manner as process 300A with application 242 issuing a request at 302 to read the identification number (or some other portion of information 114 in some embodiments) and application 242 receiving it at 304. At 336, application 242 then issues, to SEP 210, a request to collect biometric data along with the identification number. At 338, SEP 210 may instruct biosensor to collect biometric data, which SEP 210 stores the data with a unique index value. At 340, SEP 210 then provides this unique index value and the identification number to SE 134. Steps 310-316 may then be performed in a similar manner as discussed above with respect process 300A. After generating a public-key pair at 316, SE 134 issues, to validation system 120, a CSR that, in the illustrated embodiment, includes the unique index value along with the additional information discussed above with respect process 300A. Upon a successful validation, SE 134 receives a corresponding certificate certifying the public key pair at 344 and including the unique index value.

Figure 3C:
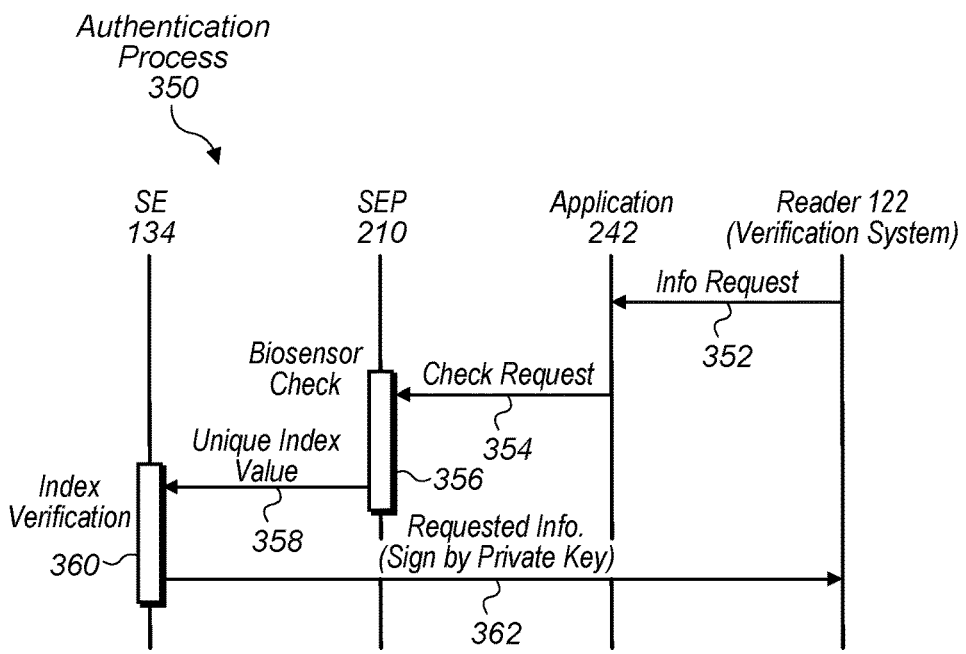

Turning now to FIG. 3C, a communication diagram of an authentication process 350 is depicted. In various embodiments, authentication process 350 may be performed when a user of mobile device 130 attempts to authenticate with a reader 122 in order to prove an identity of the user.

As shown, authentication process 350 begins at 352 with reader 122 issuing a request for identity information 114 to application 242 via NFC interface 132. At 354, application 242 issues a request to SEP 210 to check the identity of the user of mobile device 130. SEP 210 then instructs biosensor 138 to collect biometric data, which is compared by SEP 210 at 356 against stored biometric data from the previous enrollment process. If a match is detected, SEP 210 provides the corresponding unique index value to SE 134 at 358. Upon receiving the unique index value, SE 134 verifies that the unique index value matches the unique index value associated with the stored identification information 114 at 360 and issues, at 362, the requested information 114, which, in the illustrated embodiment, is signed using the private key generated during the enrollment process. If, however, the index value does not match the index value associated with the previously stored information 114, then SE 134 may signal an error and not respond at 360.

Figure 4:
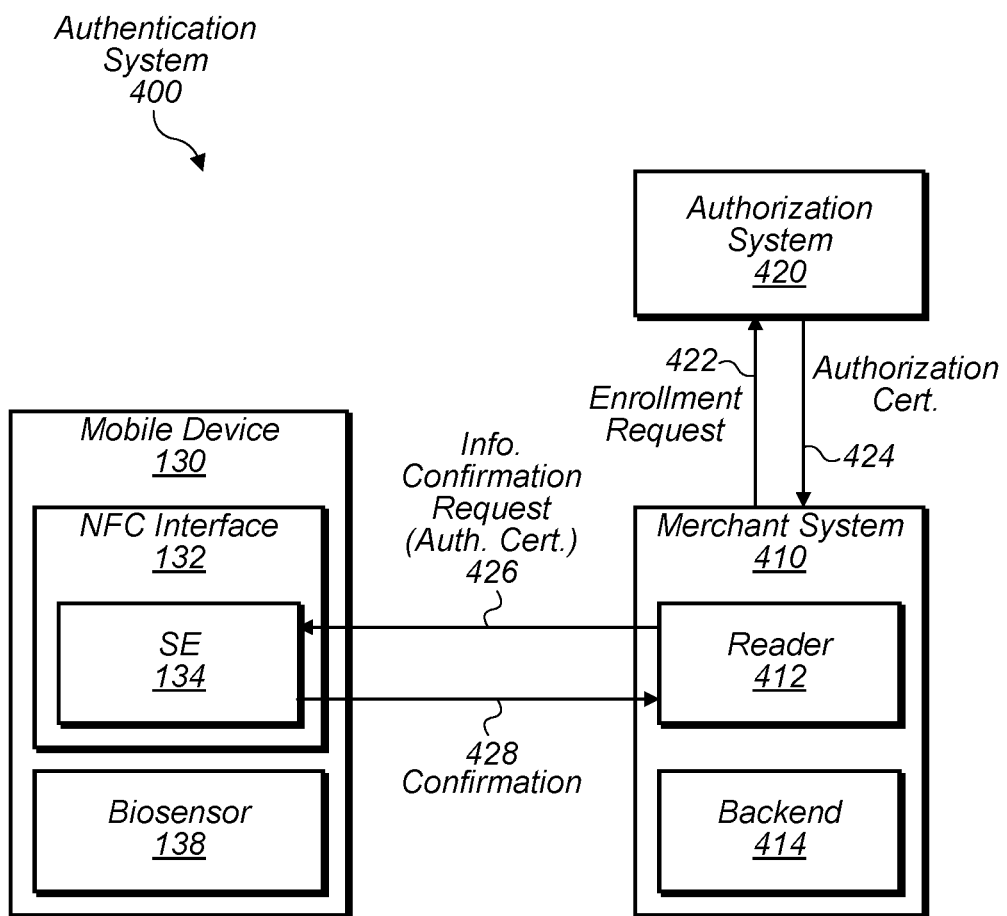
FIG. 4 is a block diagram illustrating another embodiment of a system for authenticating a user with a mobile device.

Turning now to FIG. 4, a block diagram of an authentication system 400 is depicted. As noted above, in various embodiments, mobile device 130 is configured to perform an authentication that includes SE 134 confirming whether a holder of an identification document 110 has an attribute satisfying some criterion without providing that attribute. For example, as noted above, a mobile device 130 may be used to confirm that a user is old enough to purchase a particular product (e.g., alcohol) without providing the user's date of birth to the merchant. In some embodiments, device 130 also may provide addition information, but not all information present on an identification document 110. For example, in such an embodiment, device 130 may also provide a photograph of the user, but not the user's driver license number. In some embodiments, mobile device 130 may also perform such an authentication when conducting a transaction via an authentication system such as system 400. In the illustrated embodiment, authentication system 400 includes mobile device 130, a merchant system 410, and an authorization system 420. As shown, merchant system 410 may include a reader 412 and a backend 414.

Merchant System 410, in one embodiment, includes one or more computer systems configured to facilitate a financial transaction between a user of mobile device 130 and a merchant. In illustrated embodiment, merchant system 410 interacts with mobile device 130 via a reader 412, which may implement functionality described above with respect to reader 122. Accordingly, as shown, reader 412 may be configured to issue a request 426 for SE 134 to confirm some aspect about information 114 and receiving a corresponding confirmation 428. In various embodiments, backend 414 of merchant system 410 is a computer system configured to authorize a transaction and facilitate interfacing with a transaction instrument provider such as Visa™, American Express™, MasterCard™, etc. Accordingly, in some embodiments, backend 414 may also verify a confirmation 428 when determining to authorize a transaction. In some embodiments, backend 414 is also configured to perform an enrollment process for merchant system 410 in order to enable merchant system 410 to communicate with a mobile device 130.

Authorization system 420, in one embodiment, is a computer system to facilitate enrolling a merchant system 410. In some embodiments, authorization system 420 may be operated by an authority that issues identification document 110 or a trusted third-party that interacts with the issuing authority. In some embodiments, merchant system 410 may begin an enrollment by having backend 414 generate a public-key pair and issuing an enrollment request 422 that includes a CSR for the key pair. In some embodiments, enrollment request 422 may also specify what attribute or attributes that merchant wants SE 134 to confirm. For example, in one embodiment, the request 422 may specify that a merchant wants to 1) know whether a user exceeds a particular age threshold (e.g., is over 21 years of age) and 2) be provided with a corresponding photograph of the user that is present on identification document 110. Authorization system 420 may then validate this request 422, which, in some embodiments, may be performed in a similar manner as discussed above with respect to request 136. In response to a successful validation the request, in various embodiments, authorization system 420 issues a corresponding digital certificate 424 indicating that merchant system 410 is authorized to receive the request information specified in its enrollment request 422. In some embodiments, upon merchant system 410 receiving certificate 424, backend 414 may distribute the certificate to readers 412 in order to enable them to issue requests 426. In another embodiment, rather than providing a merchant system 410 with a certificate, authorization system 420 is configured to make backend 414 an intermediate certificate authority, which has the ability to issue certificates to readers 412 for public key pairs generated by the readers 412.

When a transaction is conducted after enrollment, a reader 412 is configured to issue a request 426 that specifies that certificate 424 indicating that a merchant system 410 is authorized to obtain the requested information specified in the certificate 424. In various embodiments, upon receiving a request 426, SE 134 is configured to validate the certificate, which may include issuing a challenge to reader 412 and having backend 414 (or readers 412 in some embodiments) generate a corresponding response. In other embodiments, SE 134 may merely validate the certificate using the digital signature and public key specified in the certificate as communication between SE 134 and reader 412 is encrypted in order to prevent a third party from obtaining to certificate 424. After successfully verifying the certificate, SE 134 may confirm the identity of the user via biosensor 138 as discussed above and issue a confirmation 428 providing the requested information 114 specified in the certificate 424. Upon receiving this information, in some embodiments, reader 412 may present this information on a display to a sells representative operating a reader 412. Reader 412 may also present a prompt asking the representative to approve the information before enabling backend 414 to communicate with a transaction instrument provider.

Enrollment and authentication processes are described in further detail below with respect to FIGS. 5A and 5B.

Figure 5A:
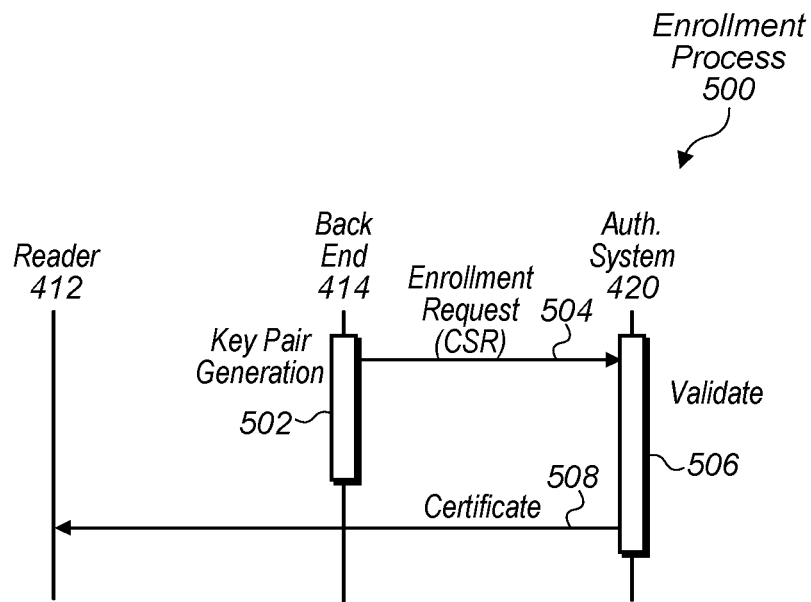
FIGS. 5A and 5B are communication diagrams illustrating embodiments of enrollment and authentication processes used by the authentication system.

Turning now to FIG. 5A, a communication diagram of an enrollment process 500 is depicted. As noted above, in various embodiments, process 500 may be performed in order to enable a merchant system to interface with mobile device 130.

As shown, enrollment process 500 begins at 504 with backend 414 generating a public key pair to be used in encrypting communications between mobile devices 130 and reader 122 as well as verifying a corresponding certificate 424. At 504, backend 414 then issues an enrollment request 422 to authorization system 420, where the enrollment request includes a CSR for the generated public-key pair. After receiving the request 422, authorization system 420 validates the request at 506 and issues a corresponding certificate 424 at 508 upon successful validation.

Figure 5B:
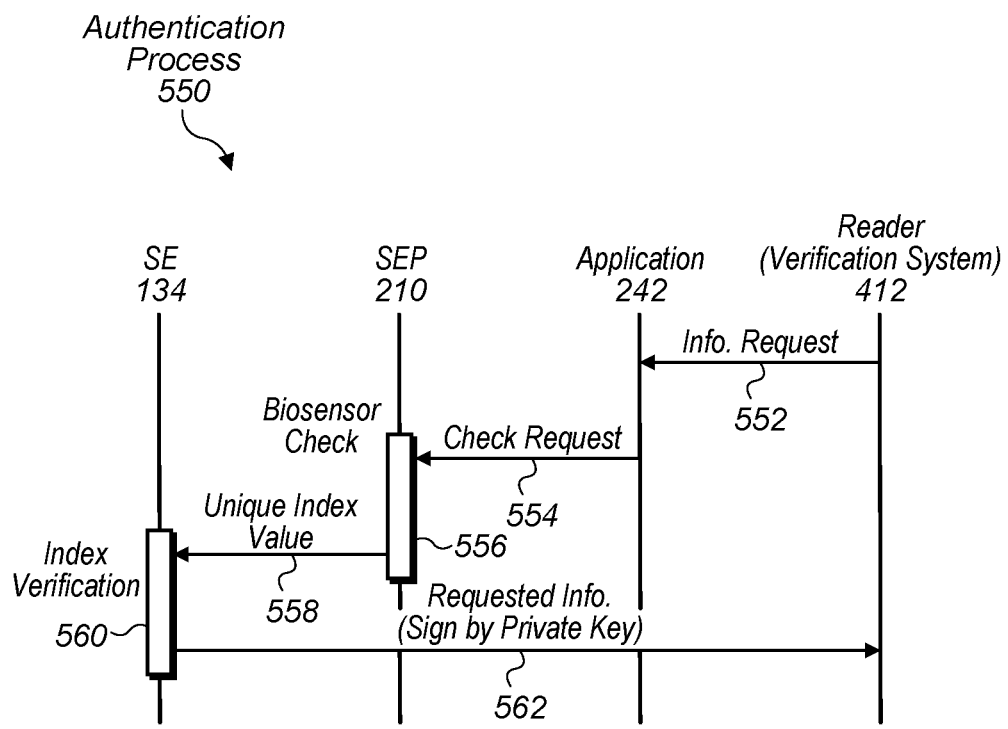

Turning now to FIG. 5B, a communication diagram of an authentication process 550 is depicted. As noted above, in some embodiments, an authentication processor 550 may be performed to authenticate some aspect about a person such as during a financial transaction.

As shown, authentication process 550 begins at 552 with reader 412 issuing a request 426 for authenticating one or more attributes about a user via an NFC interface to application 242. Upon receiving and validating the request, Application 242 issues a request to SEP 210 at 554 to ask SEP 210 to check the identity of the user. At 556, SEP 210 activates biosensor 138 and receives corresponding biometric data, which SEP 210 compares against biometric data previously stored in SEP 210 during the enrollment of mobile device 130. In response to a successful match, SEP 210 indicates the corresponding unique index value to SE 134 at 558. At 560, SE 134 verifies the unique index value against the value previously associated with the identification information 114. After successful verification, SE 134 determines what is to be provided to the reader 412 based on the information specified in the received certificate 424 and issues, at 562, the corresponding information, which may be signed by the private key established during enrollment of the mobile device 130.

User Authentication Framework

In some instances, a user may be physically present when identification information 114 of identification document 110 is being provided by mobile device 130. For example, as discussed above, mobile device 130 may be conveying information 114 to an NFC reader 122, which can be examined by a customs agent in the presence of the user. If the user is different from the person associated with identification document 110, this difference may be easily discernable by the customs agent, who may be looking at the user while also looking at a picture included in information 114 and presented on a display of verification system 120. In other instances, however, a user may not be physically present at a verification system when it receives identification information 114. For example, a user may be attempting to purchase a product (e.g., an alcoholic beverage) in an online transaction from a merchant's web server. As an employee of the merchant is not present to confirm that the user of mobile device 130 is also the holder of identification document 110, a user may attempt to use mobile device 130 to spoof being the holder of identification document 110.

As will be described below, a user authentication framework may be employed to establish that a mobile device 130 is sufficiently trustworthy to confirm that the current user of mobile device 130 is also the person identified by identification document 110. In various embodiments, mobile device 130 may present, to an issuing authority, an attestation of its capabilities to authenticate a user. Based on this attestation, the issuing authority may authorize mobile device 130 to present identification information 114 of identification document 110 and provide an indication of the issuing authority's trust of mobile device 130, which can be examined by a verification system attempting to verify the identity of a user of mobile device 130.

Figure 6:
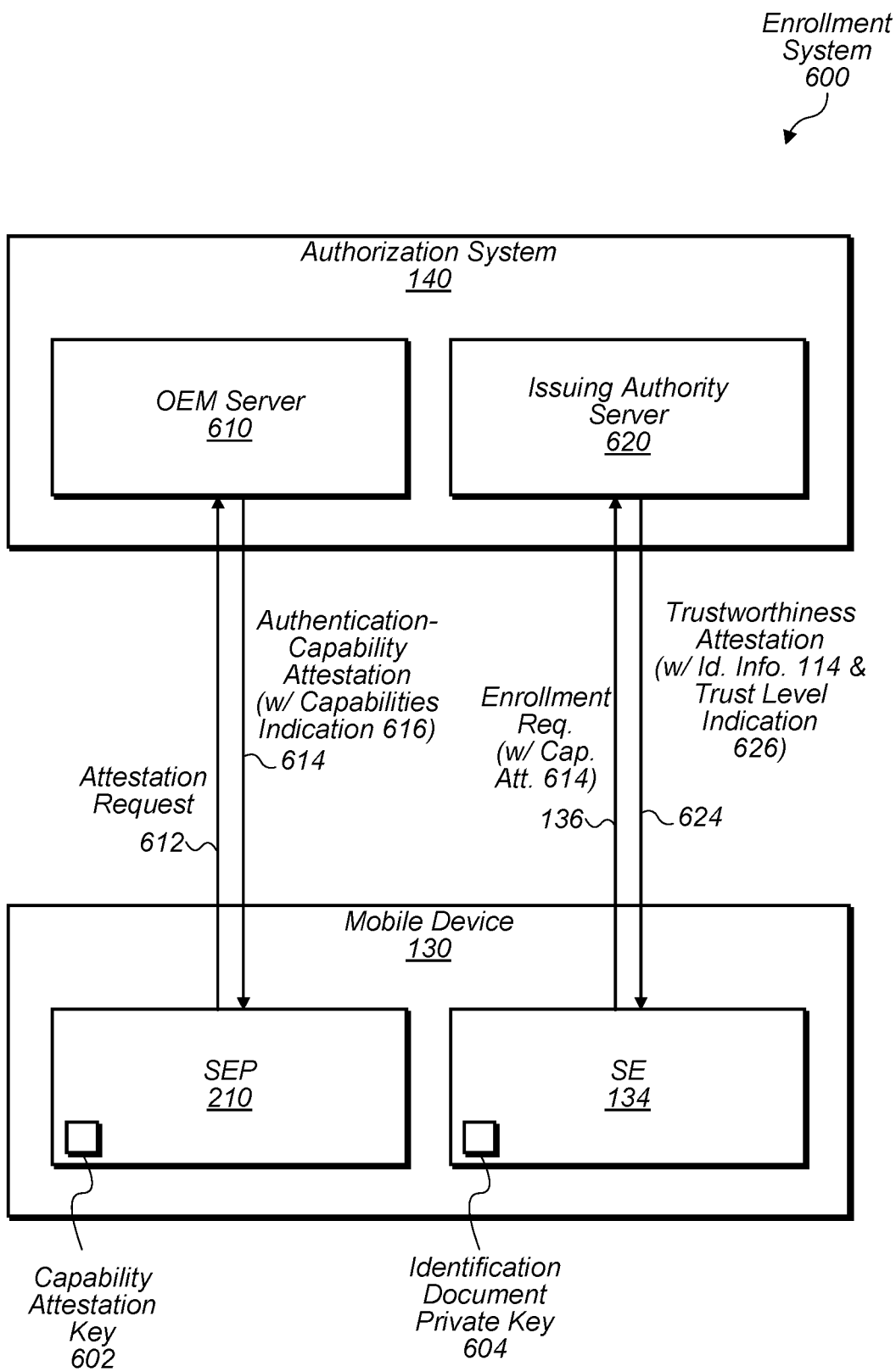
FIG. 6 is a block diagram illustrating one embodiment of an enrollment system that attests to a device's ability to authenticate a user.

Turning now to FIG. 6, a block diagram of an enrollment system 600 of the authentication framework is depicted. As mentioned in the sections above, authorization system 140 may facilitate the enrollment of mobile device 130 including confirming that a given enrollment request 136 is coming from a mobile device operated by a holder of identification document 110. In the illustrated embodiment, authorization system 140 facilitates this enrollment using original equipment manufacturer server 610 and issuing authority server 620. In other embodiments, enrollment may be implemented differently than shown. For example, although depicted for simplicity, SEP 210 and SE 134 may not attestations 614 and 624, respectively; rather, in some embodiments, these elements may be stored in memory 240 or elsewhere. Although not depicted, additional components may also be involved in the communication between mobile device 130 and authorization system 140.

Original equipment manufacturer (OEM) server 610, in various embodiments, is a computing system configured to determine mobile device 130's capabilities to authenticate a user and attest to those capabilities. In some embodiments, server 610 is associated with a manufacturer of mobile device 130, which may provision each of its devices with key 602 during fabrication that is usable by OEM server 610 to determine information about a given mobile device 130. (In other embodiments, server 610 may be operated a trusted entity other than a manufacture of mobile device 130.) For example, each generation of mobile device 130 may be provisioned with a respective key 602 usable to determine the generation of device 130 and thus its capabilities. Accordingly, if a particular generation of mobile device 130 supports being able to authenticate a user via facial recognition, fingerprint recognition, or a passcode authentication, OEM server 510 may be able to discern this based on its key 602. In the illustrated embodiment, SEP 210 stores capability attestation key 602 and uses key 602 to generate a digital signature to identify mobile device 130's identity to OEM server 130. (In some embodiments, "using" key 602 (or key 604 discussed below) may include deriving one or more additional keys from key 602 and using the additional keys to produce the digital signature. Additionally, although various references are made to digital signatures, a keyed-hash value (e.g., keyed-hash message authentication code (HMAC)) may also be used in lieu of a digital signature in some embodiments).

In various embodiments, when a user wants to enroll mobile device 130 to use it in lieu of identification document 110, mobile device 130 may issue a request 612 for an attestation 614 indicating its authentication capabilities. To enable OEM server 610 to determine these capabilities, SEP 210 may include a digital signature generated using key 602. OEM server 610 may then verify this signature and sign an attestation 614 including an indication 616 of the authentication capabilities of mobile device 130. In some embodiments, this indication 616 may explicitly indicate the capabilities—e.g., that mobile device 130 can authenticate a user via facial recognition or via a passcode verification. In other embodiments, this indication 616 may more generally include information about mobile device 130 that can be used to infer its authentication capabilities such as identifying a specific model name and number.

In some embodiments, authentication capability attestation 614 may also serve as an attestation for identification document private key 604 stored in secure element 134 in order to bind mobile device 130 to a received attestation 614. Accordingly, SE 134 may generate a public key pair having a public key and key 604 as the private key. Mobile device 130 may then include the public key and a digital signature generated from private key 604 when sending request 612 to OEM server 610, which may include the public key in attestation 614. In some embodiments, attestation request 612 may thus correspond to a certificate signing request, server 610 may correspond to a certificate authority, and attestation 614 may correspond to a certificate, which may be (or may not be) X.509 compliant. Thus, newly generated private key 604 may be usable in a challenge-response exchange to determine that mobile device 130 is the device corresponding capability attestation 614 without having to rely directly (and potentially expose) capability attestation key 602.

After receiving attestation 614, mobile device 130 may store a copy of attestation 614 and include it in an enrollment request 136 sent to issuing authority server 620 to indicate an ability to securely perform a user authentication prior to permitting access to the identification information 114.

Issuing authority (IA) server 620, in various embodiments, is a computing system configured to review an authentication capability attestation 614 and determine a trustworthiness of mobile device 130 usable by subsequent verification systems attempting to verify a user's identity based on identification information 114. In the illustrated embodiment, IA server 620 is operated by the issuer of identification document 110; however, in other embodiments, server 620 may be operated by a trusted entity other than the issuer of identification document 110. In some embodiments, server 620 may maintain a list of authentication capabilities for particular devices and a corresponding set of trust levels associated with those capabilities. For example, a particular device capable of performing facial recognition and having a secure element may be deemed to be trustworthy enough to authenticate a user attempting to perform a transaction to buy alcohol while a device that can only perform a passcode authentication and lacking secure circuitry may not be permitted to be used to buy alcohol. In various embodiments, IA server 620 verifies attestation 614 by issuing a challenge to have SE 134 generate a signature using private key 604, which can be verified using the corresponding public key in attestation 614 and the signature of server 610 included in attestation 614. In some embodiments, mobile device 130 also captures an image of a user's face and includes the image in its enrollment request 136 so that IA server 620 can compare the image with an image associated with the identification document 110 in order to confirm that a different user is not trying to spoof the holder of document 110.

In various embodiments, in response to a successful verification of attestation 614 and determining that the identified authentication capabilities are sufficient, IA server 620 issues a corresponding signed trustworthiness attestation 624 including an indication 626 of a determined level of trustworthiness of mobile device 130. For example, attestation 624 may indicate that an authentication performed by mobile device 130 may sufficiently be relied on, when accompanied with identification information 114, to perform a first set of operations, but not a second set of operations. In some embodiments, attestation 624 may include a signed copy of identification information 114 in order to persevere the integrity of information 114. In some embodiments, attestation 624 may also include the public key corresponding private key 604—thus, attestation 624 may also correspond to a certificate, which may be (or may not be) x.509 compliant. In some embodiments, attestation 624 may also indicate a mandated form of authentication to be performed by mobile device 130 in order to use identification information 114. For example, attestation 624 may indicate that mobile device 130 is permitted to use information 114 only after performing a facial-recognition authentication, but not some other form of authentication supported by mobile device 130.

Figure 7:
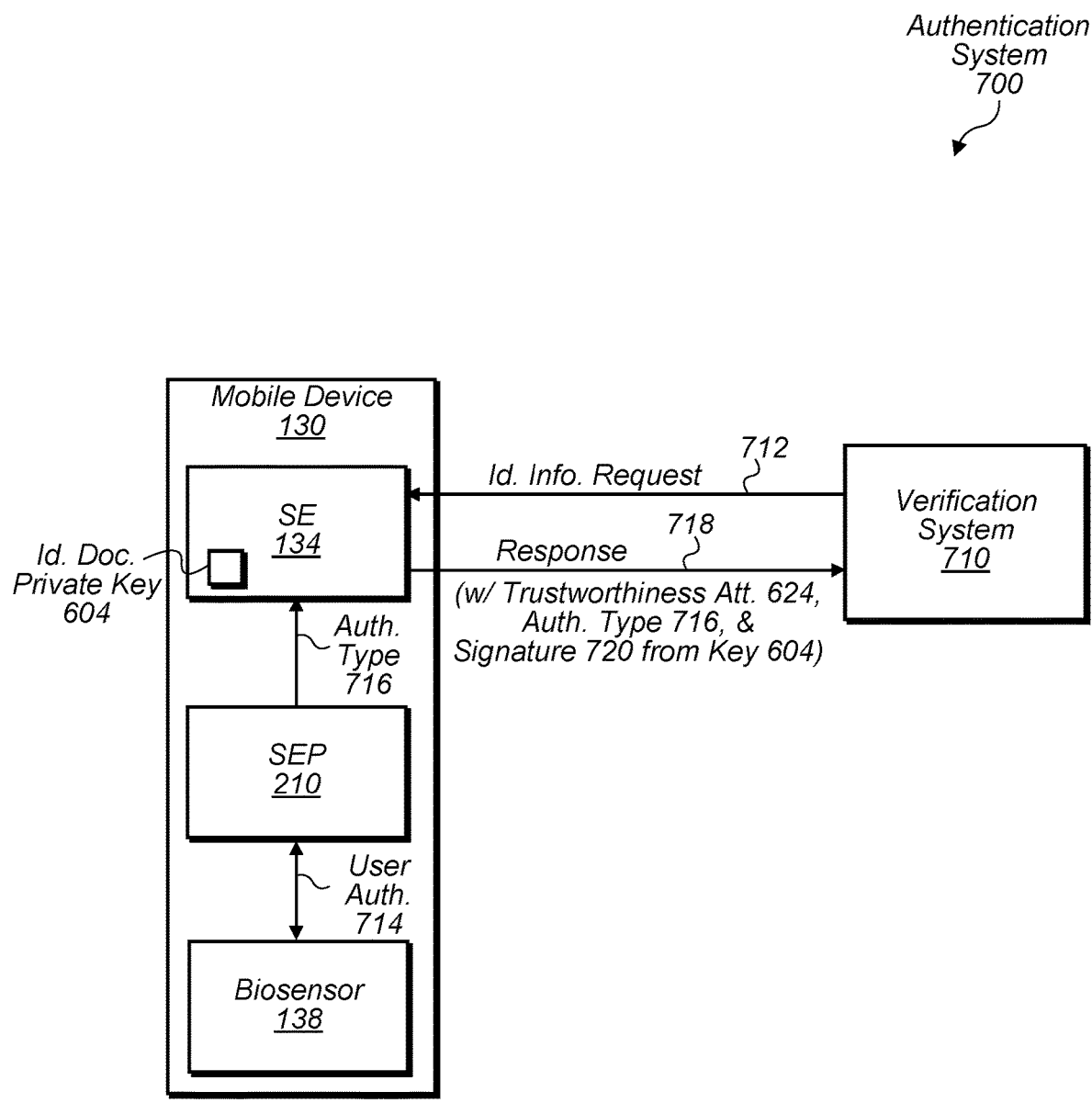
FIG. 7 is a block diagram illustrating one embodiment of an authentication system that uses a device's ability to authenticate a user.

Turning now to FIG. 7, a block diagram of an authentication system 700 of the authentication framework is depicted. In the illustrated embodiment, authentication system 700 includes a verification system 710 and mobile device 130, which, as discussed above may include SE 134, SEP 210, and biosensor 138. In some embodiments, authentication system 700 may be implemented differently than shown. For example, although SE 134 may generate signature 720, response 718 may come from application 242 discussed above in some embodiments. Although not depicted, additional components may also be involved in the communication between mobile device 130 and verification system 710.

Verification system 710 may correspond to any suitable computing system configured to verify a user's identity based on identity information 114 supplied by mobile device 130. As mentioned above, in some embodiments, verification system 710 may not be collocated with mobile device 130 and its user. For example, verification system 710 may be operated by a merchant attempting to verify a user's identity in order to allow performance of an online transaction. In the illustrated embodiment, the authentication exchange between mobile device 130 and verification system 710 may begin with system 710 issuing a request 712 for identification information 114 from SE 134. In response to receiving request 712, SEP 210 may interact with biosensor 138 to perform a user authentication 714—in some embodiments, this authentication may be in accordance with any stipulations made by IA server 620 in trustworthiness attestation 624. SEP 210 may then indicate a result of the user authentication to SE 134 as well as send an indication 716 of the type of authentication that it performed (e.g., passcode confirmation, facial recognition authentication, etc.). Based on this result, SE 134 may provide a response 718 including trustworthiness attestation 624, which, as mentioned above, may include a signed copy of identification information 114. In the illustrated embodiment, response 718 also includes the indication 716 of the type of authentication and a signature 720 generated using private key 604, which may be used to sign indication 716 and a challenge included in request 712 by verification system 710. Verification system 710 may then verify response 718, including 1) confirming that trust level indication 626 identifies mobile device 130 as being sufficiently trustworthy such that its user authentication 714 can be relied upon for whatever is being performed such as initiating a transaction to purchase alcohol and 2) that indication 716 identifies an appropriate authentication type was used.

Figures 8A, 8B:
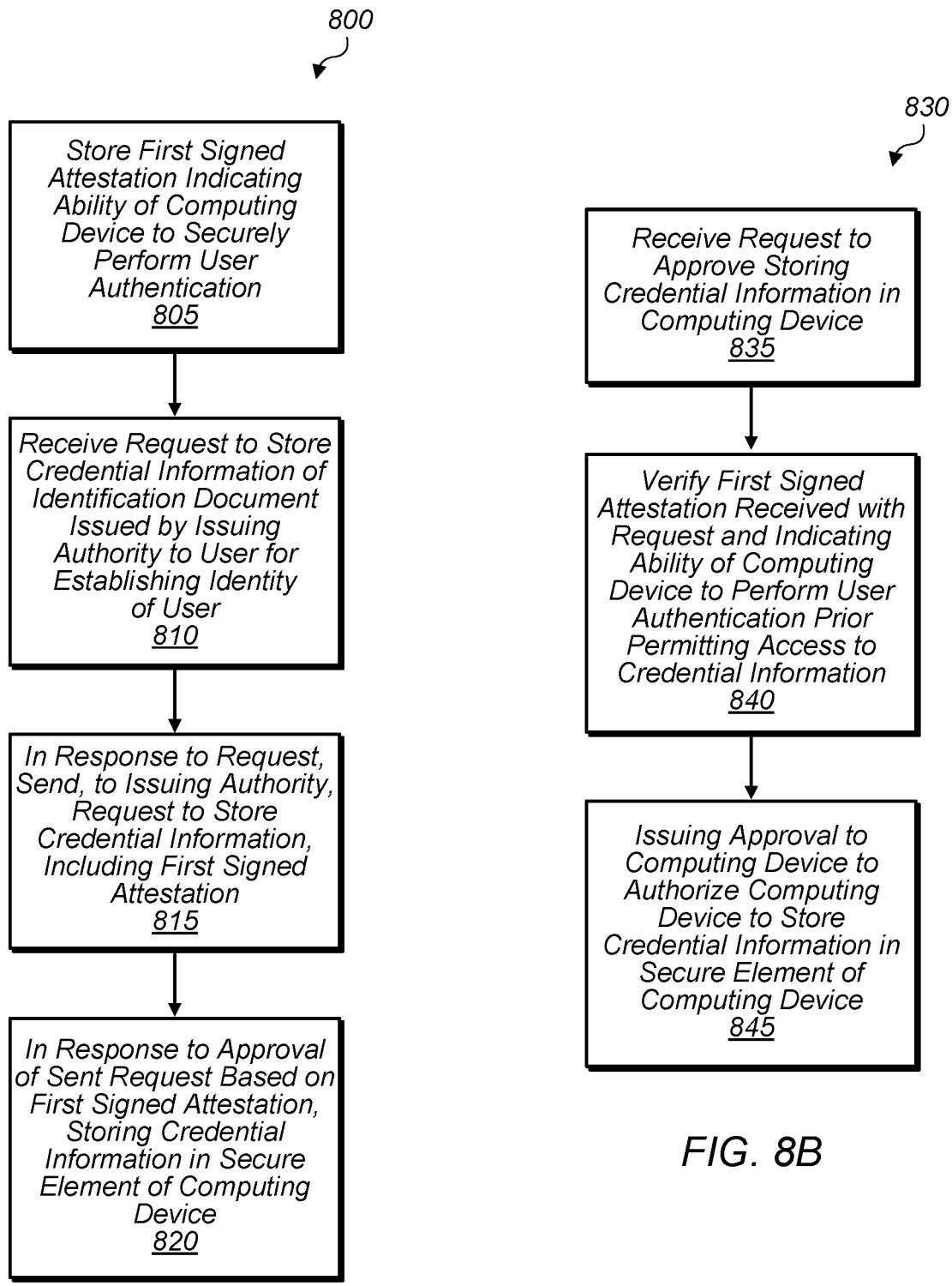
FIGS. 8A-8C are flow diagrams illustrating embodiments of methods performed by components of the system for authenticating the user with the mobile device.

Turning now to FIG. 8A, a flow diagram of a method 800 is depicted. Method 800 is one embodiment of a method performed by a computing device to store credential information such as mobile device 130. In some embodiments, method 800 may be implemented differently than shown.

In step 805, the computing device stores a first signed attestation (e.g., attestation 614) indicating an ability of the computing device to securely perform a user authentication. In some embodiments, the computing device uses a biometric sensor to perform a biometric authentication, and the first signed attestation indicates an ability (e.g., capabilities indication 616) of the computing device to perform the biometric authentication. In various embodiments, the computing device stores a key (e.g., capability attestation key 602) associated with an ability of the computing device to securely perform a user authentication. In some embodiments, the computing device sends, to a server computing system (e.g., authorization system 140), a request for the first signed attestation, and the request for the first signed attestation includes a signature generated using the stored key. In such an embodiment, in response to a successful verification of the signature, the computing device receives the first signed attestation from the server computing system. In some embodiments, the server computing system is operated by a manufacturer of the computing device (e.g., OEM server 610). In some embodiments, the key is provisioned in the computing device during fabrication of the computing device.

In step 810, the computing device receives a request to store credential information (e.g., identification information 114) of an identification document (e.g., identification documentation 110) issued by an issuing authority to a user for establishing an identity of the user.

In step 815, in response to the request, the computing device sends, to the issuing authority (e.g., issuing authority server 620), a request (e.g., enrollment request 136) to store the credential information, the sent request including the first signed attestation to indicate an ability to perform a user authentication prior to permitting access to the credential information. In some embodiments, the computing device reads a portion of the credential information by using a camera of the computing device to capture an image of the identity document and includes the portion of the credential information in the request sent to the issuing authority. In some embodiments, the computing device reads a portion of the credential information from a circuit embedded in the identity document by using a short-range radio (e.g., NFC interface 132) of the computing device.

In step 820, the computing device, in response to an approval of the sent request based on the first signed attestation, stores the credential information in a secure element (e.g., SE 134) of the computing device. In some embodiments, method 800 further includes the computing device receiving a request (e.g., identification information request 712) for the credential information from a verification system (e.g., verification system 710) attempting to verify an identity of a user of the computing device and, in response to the request for credential information, performing an authentication of the user of the computing device. Method 800 further includes, based on the performed authentication, the computing device providing the requested credential information (e.g., response 718) from the secure element to the verification system. In some embodiments, in response to sending the request to store credential information, the computing device receives a second signed attestation (e.g., trustworthiness attestation 624) from the issuing authority, and the second signed attestation includes a signed copy of the credential information and an indication identifying a level of trustworthiness of the computing device determined based on the first signed attestation. In such an embodiment, the computing device provides the second signed attestation to the verification system. In some embodiments, in response to receiving the request to store credential information, the secure element of the computing device generates a public-key pair having a public key and a private key (e.g., private key 604) and includes the public key in the request sent to the issuing authority, which is operable to include the public key in the second signed attestation. In such an embodiment, the computing device performs a challenge-response exchange with the verification system and using the private key.

Turning now to FIG. 8B, a flow diagram of a method 830 is depicted. Method 830 is one embodiment of a method performed by a computing system to approve storage of credential information such as authorization system 140 (or more specifically issuing authority server 620). In some embodiments, method 830 may be implemented differently than shown.

In step 835, the computing system receives a request (e.g., enrollment request 136) to approve storing credential information in a computing device (e.g., mobile device 130). In various embodiments, the credential information is of an identification document (e.g., identification document 110) issued by an issuing authority to a user for establishing an identity of the user.

In step 840, the computing system verifies a first signed attestation (e.g., attestation 614) received with the request, the first signed attestation indicating an ability of the computing device to perform a user authentication prior to permitting access to the credential information.

In step 845, based on the verifying, the computing system issues an approval to the computing device to authorize the computing device to store the credential information in a secure element (e.g., SE 134) of the computing device. In some embodiments, issuing the approval includes sending a second signed attestation (e.g., trustworthiness attestation 624) from the issuing authority, and the second signed attestation includes a signed copy of the credential information. In some embodiments, the receiving includes receiving a public key of a public-key pair generated by the secure element, and the issuing includes including, by the computing system, the public key in the second signed attestation. In such an embodiment, a private key (e.g., private key 604) of the public key pair is usable in a challenge-response exchange with a verification system (e.g., verification system 710) to verify the credential information. In some embodiments, the second signed attestation includes an indication identifying a level of trustworthiness (e.g., trust level indication 626) of the computing device determined based on the first signed attestation. In some embodiments, the receiving includes receiving a portion of the credential information captured from the identification document by using a camera of the computing device, and the verifying includes verifying the portion of the credential information.

In some embodiments, method 830 further includes the computing system sending, to the computing device, a request (e.g., request 712) for the credential information, receiving, from the secure element of the computing device, the credential information and a signature (e.g., signature 720) generated responsive to the computing device performing an authentication of the user, and performing a verification of the received credential information includes verifying the signature. In some embodiments, method 830 further includes receiving, from the computing device, a request (e.g., attestation request 612) for the first attestation, the request including a signature generated using a key (e.g., key 602) associated with an ability of the computing device to securely perform a user authentication. In such an embodiment, in response to a successful verification of the signature, the computing system provides the first attestation to the computing device.

Figure 8C:
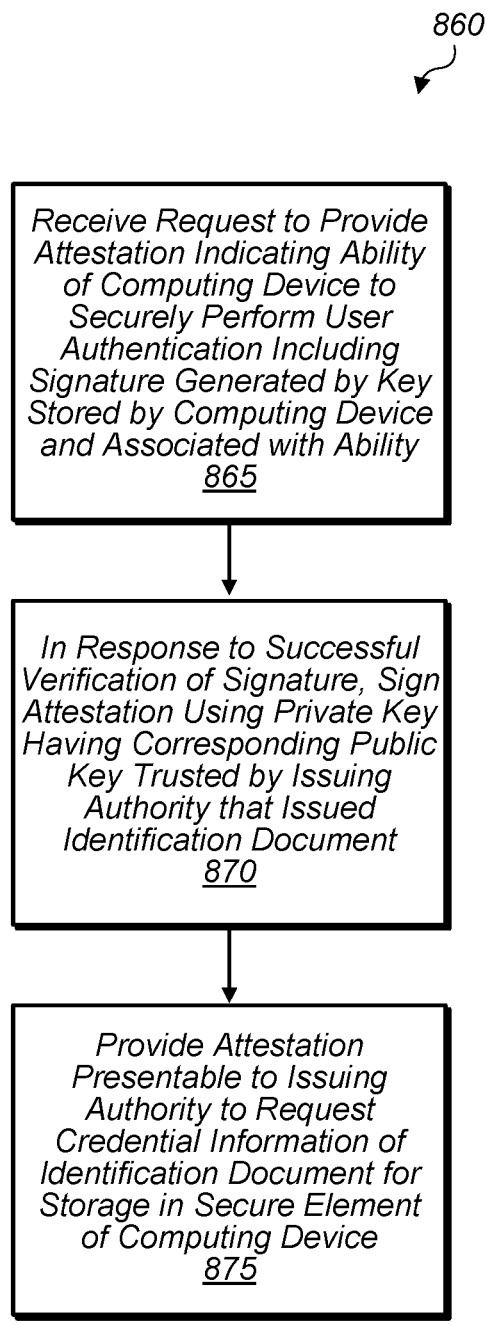

Turning now to FIG. 8C, a flow diagram of a method 860 is depicted. Method 860 is one embodiment of a method performed by a computing system to issue an attestation for storing credential information such as authorization system 140 (or more specifically OEM server 620). In some embodiments, method 860 may be implemented differently than shown.

Method 860 begins, in step 865, with a computing system receiving a request (e.g., attestation request 612) to provide an attestation (e.g., attestation 624) indicating an ability of a computing device (e.g., mobile device 130) to securely perform a user authentication, the request including signature generated by a key (e.g., key 602) stored by the computing device and associated with the ability. In some embodiments, the stored key is stored in a secure circuit (e.g., SEP 210) within the computing device. In some embodiments, the stored key is stored in the computing device during fabrication of the computing device by a manufacturer of the computing device. In step 870, in response to a successful verification of the signature, the computing system signs the attestation using a private key having a corresponding public key trusted by an issuing authority that issued an identification document to a user of the computing device. In step 875, the computing system provides the attestation to the computing device, the attestation being presentable to the issuing authority to request credential information of the identification document for storage in a secure element of the computing device.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a computing device to perform operations comprising:
   sending, to a server computing system, a request for a first signed attestation, wherein the request for the first signed attestation includes a signature generated using a key of the computing device that is associated with an ability of the computing device to securely perform a user authentication;
   in response to a successful verification of the signature, receiving the first signed attestation from the server computing system, wherein the first signed attestation indicates an ability of the computing device to securely perform a user authentication;
   receiving a request to store credential information of an identification document issued by an issuing authority to a user for establishing an identity of the user;
   in response to the request, sending, to the issuing authority, a request to store the credential information, wherein the sent request includes the first signed attestation to indicate an ability to perform a user authentication prior to permitting access to the credential information; and
   in response to an approval of the sent request based on the first signed attestation, storing the credential information in a secure element of the computing device.

2. The computer readable medium of claim 1, wherein the operations further comprise:
   receiving a request for the credential information from a verification system attempting to verify an identity of a user of the computing device;
   in response to the request for credential information, performing an authentication of the user of the computing device; and
   based on the performed authentication, providing the requested credential information from the secure element to the verification system.

3. The computer readable medium of claim 2, wherein the operations further comprise:
   in response to sending the request to store credential information, receiving a second signed attestation from the issuing authority, wherein the second signed attestation includes a signed copy of the credential information and an indication identifying a level of trustworthiness of the computing device determined based on the first signed attestation; and
   providing the second signed attestation to the verification system.

4. The computer readable medium of claim 3, wherein the operations further comprise:
   in response to receiving the request to store credential information, the secure element of the computing device generating a public-key pair having a public key and a private key;
   including the public key in the request sent to the issuing authority, wherein the issuing authority is operable to include the public key in the second signed attestation; and
   performing a challenge-response exchange with the verification system and using the private key.

5. The computer readable medium of claim 1, wherein the operations further comprise:
   using a biometric sensor to perform a biometric authentication, and wherein the first signed attestation indicates an ability of the computing device to perform the biometric authentication.

6. The computer readable medium of claim 1, wherein the server computing system is operated by a manufacturer of the computing device.

7. The computer readable medium of claim 1, wherein the key is provisioned in the computing device during fabrication of the computing device.

8. The computer readable medium of claim 1, wherein the operations further comprise:
   reading a portion of the credential information by using a camera of the computing device to capture an image of the identification document; and
   including the portion of the credential information in the request sent to the issuing authority.

9. The computer readable medium of claim 1, wherein the operations further comprise:
   reading a portion of the credential information from a circuit embedded in the identification document by using a short-range radio of the computing device.

10. A method, comprising:
    receiving, by a computing system, a request to approve storing credential information in a computing device, wherein the credential information is of an identification document issued by an issuing authority to a user for establishing an identity of the user;
    verifying, by the computing system, a first signed attestation received with the request, wherein:
      the first signed attestation indicates an ability of the computing device to perform a user authentication prior to permitting access to the credential information;
      the first signed attestation was generated based on verification of a capability signature, wherein the capability signature was generated using a key associated with the ability of the computing device to securely perform the user authentication; and
    the verifying includes:
      validating a signature of the first signed attestation; and
      determining that the indicated ability of the computing device includes a biometric authentication capability that provides a level of trust that is sufficient to authorize one or more operations associated with the credential information; and
    based on the verifying, issuing, by the computing system, an approval to the computing device to authorize the computing device to store the credential information in a secure element of the computing device.

11. The method of claim 10, wherein issuing the approval includes sending a second signed attestation from the issuing authority, wherein the second signed attestation includes a signed copy of the credential information.

12. The method of claim 11, wherein the receiving includes receiving a public key of a public key pair generated by the secure element; and
    wherein the issuing includes including, by the computing system, the public key in the second signed attestation, wherein a private key of the public key pair is usable in a challenge-response exchange with a verification system to verify the credential information.

13. The method of claim 11, wherein the second signed attestation includes an indication identifying a level of trustworthiness of the computing device determined based on the first signed attestation.

14. The method of claim 10, wherein the receiving includes receiving a portion of the credential information captured from the identification document by using a camera of the computing device; and wherein the verifying includes verifying the portion of the credential information.

15. The method of claim 10, further comprising:
sending, by the computing system and to the computing device, a request for the credential information;
receiving, by the computing system and from the secure element of the computing device, the credential information and a second signature generated responsive to the computing device performing an authentication of the user; and
performing, by the computing system, a verification of the received credential information, wherein the verification includes verifying the second signature.

16. The method of claim 10, further comprising:
receiving, by the computing system and from the computing device, a request for the first signed attestation and
in response to a successful verification of the capability signature, the computing system providing the first signed attestation to the computing device.

17. A method, comprising:
sending, by a computing device to a server computing system, a request for a first signed attestation, wherein the request for the first signed attestation includes a signature generated using a key of the computing device that is associated with an ability of the computing device to securely perform a user authentication;
in response to a successful verification of the signature, the computing device receiving the first signed attestation from the server computing system, wherein the first signed attestation indicates an ability of the computing device to securely perform a user authentication;
receiving, by the computing device, a request to store credential information of an identification document issued by an issuing authority to a user for establishing an identity of the user;
in response to the request, the computing device sending, to the issuing authority, a request to store the credential information, wherein the sent request includes the first signed attestation to indicate an ability to perform a user authentication prior to permitting access to the credential information; and
in response to an approval of the sent request based on the first signed attestation, the computing device storing the credential information in a secure element of the computing device.

18. The method of claim 17, further comprising:
Receiving, by the computing device, a request for the credential information from a verification system attempting to verify an identity of a user of the computing device;
in response to the request for credential information, the computing device performing an authentication of the user of the computing device; and
based on the performed authentication, the computing device providing the requested credential information from the secure element to the verification system.

19. The method of claim 18, further comprising:
in response to sending the request to store credential information, the computing device receiving a second signed attestation from the issuing authority, wherein the second signed attestation includes a signed copy of the credential information and an indication identifying a level of trustworthiness of the computing device determined based on the first signed attestation; and
providing, by the computing device, the second signed attestation to the verification system.

20. The method of claim 19, further comprising:
in response to receiving the request to store credential information, the secure element of the computing device generating a public-key pair having a public key and a private key;
including, by the computing device, the public key in the request sent to the issuing authority, wherein the issuing authority is operable to include the public key in the second signed attestation; and
performing, by the computing device, a challenge-response exchange with the verification system and using the private key.

* * * * *